United States Patent
Lim et al.

(10) Patent No.: US 7,209,764 B2
(45) Date of Patent: Apr. 24, 2007

(54) APPARATUS AND METHOD FOR RECEIVING CHANNEL SIGNAL USING SPACE TIME TRANSMIT DIVERSITY SCHEME IN CODE DIVISION MULTIPLE ACCESS COMMUNICATION SYSTEM

(75) Inventors: Young-Seok Lim, Seoul (KR); Won-Ick Ahn, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 636 days.

(21) Appl. No.: 10/397,852

(22) Filed: Mar. 27, 2003

(65) Prior Publication Data

US 2003/0220122 A1   Nov. 27, 2003

(30) Foreign Application Priority Data

Mar. 27, 2002   (KR)   ............... 10-2002-0016857

(51) Int. Cl.
*H04Q 7/20*      (2006.01)
*H04B 7/00*      (2006.01)
*H04B 7/02*      (2006.01)

(52) U.S. Cl. .................... 455/522; 455/69; 455/101

(58) Field of Classification Search .............. 455/522, 455/562.1, 69, 127.1, 127.5, 13.4, 92, 101, 455/103; 370/334, 339; 375/148, 267
See application file for complete search history.

(56) References Cited

U.S. PATENT DOCUMENTS

| | | | | |
|---|---|---|---|---|
| 6,317,411 B1* | 11/2001 | Whinnett et al. | ........... | 370/204 |
| 6,594,473 B1* | 7/2003 | Dabak et al. | ............... | 455/101 |
| 6,650,694 B1* | 11/2003 | Brown et al. | ............... | 375/150 |
| 6,721,300 B1* | 4/2004 | Akiba et al. | ................ | 370/342 |
| 6,977,910 B1* | 12/2005 | Hosur et al. | ................ | 370/318 |
| 6,987,746 B1* | 1/2006 | Song | .......................... | 370/335 |
| 2001/0021236 A1* | 9/2001 | Song | .......................... | 375/366 |
| 2002/0118727 A1* | 8/2002 | Kim et al. | .................. | 375/146 |
| 2003/0133493 A1* | 7/2003 | Suzuki et al. | ............... | 375/130 |

* cited by examiner

*Primary Examiner*—Tilahun Gesesse
(74) *Attorney, Agent, or Firm*—Roylance, Abrams, Berdo & Goodman L.L.P.

(57) ABSTRACT

Disclosed is an apparatus and method for receiving a channel signal using a STTD (Space Time Transmit Diversity) scheme in a CDMA communication system. In the CDMA communication system a transmitter with first and second antennas STTD (Space Time Transmit Diversity)-encodes a channel signal having PC (Power Control) information of a receiver and transmits a STTD-encoded result over first and second antennas, a first antenna signal processor receives a signal transmitted from the transmitter, and processes the received signal as a signal transmitted from the first antenna using a first pattern, a second antenna signal processor processes the received signal as a signal transmitted from the second antenna using a second pattern orthogonal to the first pattern, and an adder combines an output signal of the first and second antenna signal processor, and generates the PC information, resulting in no delay time while detecting such PC information.

22 Claims, 11 Drawing Sheets

APPARATUS AND METHOD FOR RECEIVING CHANNEL SIGNAL USING SPACE TIME TRANSMIT DIVERSITY SCHEME IN CODE DIVISION MULTIPLE ACCESS COMMUNICATION SYSTEM

PRIORITY

This application claims priority to an application entitled "APPARATUS AND METHOD FOR RECEIVING CHANNEL SIGNAL USING SPACE TIME TRANSMIT DIVERSITY SCHEME IN CODE DIVISION MULTIPLE ACCESS COMMUNICATION SYSTEM", filed in the Korean Intellectual Property Office on Mar. 27, 2002 and assigned Serial No. 2002-16857, the contents of which are hereby incorporated by reference.

BACKGROUND OF THE INVENTION

1. Field of the Invention

The present invention relates to a code division multiple access (CDMA) communication system, and more particularly, to an apparatus and method for receiving a channel signal transmitted using a space time transmit diversity (STTD) scheme.

2. Description of the Related Art

As mobile telecommunication systems have rapidly developed and the amount of data for use in such mobile telecommunication systems has rapidly increased, the third generation mobile telecommunication system for transmission of data at a higher speed has been recently developed. As for the third generation mobile telecommunication system, a W-CDMA (Wideband-Code Division Multiple Access) scheme, which is an asynchronous scheme among Node Bs, has been widely used in Europe as the wireless access standard, and a CDMA-2000 scheme, which is a synchronous scheme among Node Bs, has been widely used in North America as the wireless access standard. Typically, the mobile telecommunication system enables a plurality of user equipments (UEs) to intercommunicate via one Node B. However, phase distortion of the reception signal occurs in the mobile telecommunication system because the fading phenomenon occurs on the wireless channel during transmission of high-speed data. The fading phenomenon causes the amplitude of a reception signal to be reduced from several tens of dB to a few dB. Therefore, if the distorted phase of the reception signal is not compensated during a data demodulation process, an undesirable information error occurs in transmission data from the transmission end, such that the quality of service (QoS) of the mobile telecommunication system is deteriorated. In order to transmit high-speed data without such QoS deterioration, the problem of the fading phenomenon must be solved. The result is that a variety of diversity schemes have been widely used to solve such fading phenomenon.

Typically, a CDMA scheme uses a rake receiver for performing diversity reception using delay spread of a channel signal. A general rake receiver uses a receive diversity scheme for receiving a multi-path signal. However, a rake receiver based on a diversity scheme using the delay spread is inactivated when a value of the delay spread is lower than a prescribed value. Also, a time diversity scheme using an interleaving and coding operation is typically used for a Doppler spread channel. However, it is difficult to use the time diversity scheme in a low-speed Doppler spread channel.

Therefore, in order to solve the fading phenomenon, a space diversity scheme has been used for a channel having both a low delay spread, such as an indoor channel, and a channel having a low-speed Doppler spread, such as a walker channel. The space diversity scheme uses at least two transmission/reception antennas. Described in greater detail, if the magnitude of a signal transmitted via one antenna is reduced by the fading phenomenon, the space diversity scheme demodulates a transmission signal by receiving signals transmitted via the rest of antennas. The space diversity scheme is classified as a receive antenna diversity scheme using a reception antenna, and a transmit antenna diversity scheme using a transmission antenna. However, because the receive antenna diversity scheme is used for UEs, it is difficult to install a plurality of antennas to each UE in light of the size and cost of each UE. Therefore, it is preferable to use the transmit antenna diversity scheme, which installs many antennas at a Node B.

The transmit antenna diversity scheme uses a specific algorithm for receiving a downlink signal to obtain a diversity gain, the diversity gain can be classified as an open loop mode transmit diversity and a closed loop mode transmit diversity. In case of the open loop mode transmit diversity, wherein the Node B encodes information bits and transmits them via a plurality of diversity antennas, the UE receives signals transmitted from the Node B and decodes the received signals such that a certain diversity gain is obtained. In case of the closed loop mode transmit diversity, wherein the UE estimates and calculates channel environments through which signals transmitted via transmission antennas of a Node B will travel in the future, weighted values of the antennas of the Node B are calculated on the basis of the calculated estimation values in order to obtain a maximal power value of a reception signal. The weighted values are then transmitted to the Node B via an uplink, wherein the Node B receives them from each UE and applies each of the weighted values to each antenna, thereby adjusting each weighted value of the antennas. In this case, the Node B transmits a pilot signal to every antenna to measure a channel of the UE, resulting in the UE measuring the channel using the pilot signal for every antenna and finds an optimal weighted value based on the measured channel information.

The channel of a mobile telecommunication system using the W-CDMA scheme is mainly comprised of a physical channel, a transport channel, and a logical channel. The physical channel can be further classified as a downlink physical channel and an uplink physical channel according to the transmission direction of information data. The downlink physical channel can then be further classified as a physical downlink shared channel (PDSCH) and a downlink dedicated physical channel (DPCH), and will hereinafter be described with reference to FIG. 1.

FIG. 1 is a view illustrating a configuration of a downlink DPCH of a mobile telecommunication system.

Referring to FIG. 1, each frame of the downlink DPCH includes 15 slots (slot#0 through slot#14). Each slot includes a DPDCH dedicated physical data channel (DPDCH) for transmitting upper layer data transmitted from a Node B to a UE, and a dedicated physical control channel (DPCCH) for transmitting a control signal of a physical layer. The DPCCH includes a transmit power control (TPC) symbol for controlling the transmission power of the UE, a transport format combination indicator (TFCI) symbol, and a pilot symbol. As shown in FIG. 1, each slot contained in one frame of the downlink DPCH is comprised of 2560 chips (1 chip=1 bit). A Data1 symbol and a Data2 symbol each indicate upper layer data transmitted from the Node B to the UE over the DPDCH. The TPC symbol indicates information for enabling the Node B to control a transmit power (TP) value of the UE. In the meantime, the TFCI symbol indicates which one of transport format combinations (TFCs) is applied to a downlink channel transmitted during one frame of 10 ms duration. Finally, the pilot symbol indicates a reference for enabling the UE to control a TP of a DPCH. In this case, information contained in the TFCI symbol is classified into dynamic part information and semi-static part information. The dynamic part includes transport block size (TBS) information and transport block set size (TBSS) information. The semi-static part includes transmit time interval (TTI) information, channel coding scheme information, coding rate information, static rate matching information, and cyclic redundancy check (CRC) size information, etc. Therefore, the TFCI symbol indicates the number of transport blocks (TBs) of a channel transmitted during one frame, and assigns a predetermined number to a TFC available in each TB.

A signal transmission process over the DPCH uses a space time block coding based transmit diversity (STTD) scheme among the aforementioned open loop mode transmit diversity schemes, as prescribed in the UMTS standard TS 25.211. Besides the DPCH, there are a variety of channels adapting the STTD scheme, i.e., a P_CCPCH primary _ common control physical channel (P_CCPCH), a secondary_common control physical channel (S_CCPCH), a synchronization channel (SCH), a page indication channel (PICH), an acquisition indication channel (AICH), and a PDSCH, among others.

A channel encoding operation according to the STTD scheme will hereinafter be described with reference to FIG. 2.

FIG. 2 is a view illustrating a channel encoding process using a STTD encoder.

Referring to FIG. 2, a plurality of symbols sequentially enter a STTD encoder 119 according to a transmit diversity coding section used in the transmit diversity scheme. The STTD encoder 119 encodes the symbols with the STTD scheme, and then outputs the encoded symbols to two transmission antennas, i.e., a first antenna and a second antenna. For example, if a symbol $S_1$ enters a transmit diversity coding section $T_1$ and then a symbol $S_2$ enters a transmit diversity coding section $T_2$, (i.e., if the symbols $S_1 \sim S_2$ sequentially enter the STTD encoder 119), the STTD encoder 119 performs the STTD encoding on the symbols $S_1 \sim S_2$, transmits a symbol signal $S_1 S_2$ to the first antenna, and transmits a symbol signal $-S_2^* S_1^*$ to the second antenna.

A channel information bit encoding operation of the STTD encoder 119 shown in FIG. 2 will hereinafter be described with reference to FIG. 3.

FIG. 3 is a view illustrating a channel information bit encoding process via the STTD encoder 119 shown in FIG. 2.

Referring to FIG. 3, it is assumed that the symbols $S_1 \sim S_2$ sequentially received according to the transmit diversity coding sections are composed of channel information bits of $b_0 b_1$ and channel information bits of $b_2 b_3$, respectively. Initially, channel information bits $b_0 b_1 b_2 b_3$ corresponding to the symbols $S_1 \sim S_2$ enter the STTD encoder 119. The STTD encoder 119 performs the STTD encoding on the channel information bits of $b_0 b_1 b_2 b_3$, thereby transmitting channel information bits $b_0 b_1 b_2 b_3$ ($S_1 S_2$) to the first antenna, and transmitting channel information bits $-b_2 b_3 b_0 -b_1$ ($-S_2^* S_1^*$) to the second antenna.

As described above, the downlink DPCH signals are transmitted according to the STTD encoding scheme. Particularly, signals transmitted over the TPC field and the pilot field of the downlink DPCH are STTD-encoded according to the following regulations.

The TPC field's signals, i.e., TPC bits, are all STTD-encoded. Typically, signals over the TPC field are transmitted with bits having the same value during one slot time. In this case, if the STTD encoding is applied to the TPC field and the number of TPC bits transmitted over the TPC field is 4 or 8, the STTD encoding among the TPC bits is performed. In the meantime, because the STTD encoding is not performed using TPC bits only when the number of the TPC bits is 2, the TPC bits are STTD-encoded along with the last two bits of the Data1 field and then transmitted to the first and second antennas.

The pilot field is differently encoded differently according to the number of its own bits. For example, if the number of bits of the pilot field is 2, the STTD encoding is performed along with the last symbol of the Data2 field. If the number of bits of the pilot field is 4, the STTD encoding is performed between two symbols of the pilot fields. If the number of bits of the pilot field is 8 or 16, i.e., a multiple of 8, the STTD encoding is performed between even symbols and an encoding operation is performed between odd symbols to maintain orthogonality of the signals of the pilot field. Here, the pilot field forms one symbol with two bits such that one pilot symbol is formed when the number of bits of the pilot field (hereinafter referred to as pilot bits) is 2. So, the STTD encoding is performed on the formed one pilot symbol along with the last symbol of the Data2 field adjacent to the pilot field. Also, two pilot symbols are formed when the number of pilot bits is 4, such that the STTD encoding between the formed two pilot symbols is performed. At least four pilot symbols are formed when the number of pilot bits is at least 8, such that the STTD encoding between even pilot symbols is performed, and an encoding operation is performed between odd pilot symbols to maintain orthogonality of signals of the pilot field. In this way, if the symbols of the pilot field are STTD-encoded, orthogonality is provided to signals of the pilot fields of a plurality of antennas, i.e., first and second antennas.

Tables 1 and 2 below describe the signal patterns (i.e., pilot patterns) transmitted over the pilot field.

TABLE 1

| Symbol | $N_{pilot} = 2$ | $N_{pilot} = 4$ (*1) | | $N_{pilot} = 8$ (*2) | | | | $N_{pilot} = 16$ (*3) | | | | | | | |
|---|---|---|---|---|---|---|---|---|---|---|---|---|---|---|---|
| # | 0 | 0 | 1 | 0 | 1 | 2 | 3 | 0 | 1 | 2 | 3 | 4 | 5 | 6 | 7 |
| Slot #0 | 11 | 11 | 11 | 11 | 11 | 11 | 10 | 11 | 11 | 11 | 10 | 11 | 11 | 11 | 10 |
| 1 | 00 | 11 | 00 | 11 | 00 | 11 | 10 | 11 | 00 | 11 | 10 | 11 | 11 | 11 | 00 |
| 2 | 01 | 11 | 01 | 11 | 01 | 11 | 01 | 11 | 01 | 11 | 01 | 11 | 10 | 11 | 00 |

TABLE 1-continued

| Symbol | $N_{pilot} = 2$ | $N_{pilot} = 4$ (*1) | | $N_{pilot} = 8$ (*2) | | | | $N_{pilot} = 16$ (*3) | | | | | | | |
|---|---|---|---|---|---|---|---|---|---|---|---|---|---|---|---|
| # | 0 | 0 | 1 | 0 | 1 | 2 | 3 | 0 | 1 | 2 | 3 | 4 | 5 | 6 | 7 |
| 3 | 00 | 11 | 00 | 11 | 00 | 11 | 00 | 11 | 00 | 11 | 00 | 11 | 01 | 11 | 10 |
| 4 | 10 | 11 | 10 | 11 | 10 | 11 | 01 | 11 | 10 | 11 | 01 | 11 | 11 | 11 | 11 |
| 5 | 11 | 11 | 11 | 11 | 11 | 11 | 10 | 11 | 11 | 11 | 10 | 11 | 01 | 11 | 01 |
| 6 | 11 | 11 | 11 | 11 | 11 | 11 | 00 | 11 | 11 | 11 | 00 | 11 | 10 | 11 | 11 |
| 7 | 10 | 11 | 10 | 11 | 10 | 11 | 00 | 11 | 10 | 11 | 00 | 11 | 10 | 11 | 00 |
| 8 | 01 | 11 | 01 | 11 | 01 | 11 | 10 | 11 | 01 | 11 | 10 | 11 | 00 | 11 | 11 |
| 9 | 11 | 11 | 11 | 11 | 11 | 11 | 11 | 11 | 11 | 11 | 11 | 11 | 00 | 11 | 11 |
| 10 | 01 | 11 | 01 | 11 | 01 | 11 | 01 | 11 | 01 | 11 | 01 | 11 | 11 | 11 | 10 |
| 11 | 10 | 11 | 10 | 11 | 10 | 11 | 11 | 11 | 10 | 11 | 11 | 11 | 00 | 11 | 10 |
| 12 | 10 | 11 | 10 | 11 | 10 | 11 | 00 | 11 | 10 | 11 | 00 | 11 | 01 | 11 | 01 |
| 13 | 00 | 11 | 00 | 11 | 00 | 11 | 11 | 11 | 00 | 11 | 11 | 11 | 00 | 11 | 00 |
| 14 | 00 | 11 | 00 | 11 | 00 | 11 | 11 | 11 | 00 | 11 | 11 | 11 | 10 | 11 | 01 |

Table 1 above shows pilot patterns transmitted over the first antenna, and her pilot patterns transmitted over the second antenna are shown in Table 2.

TABLE 2

| Symbol | $N_{pilot} = 2$ (*1) | $N_{pilot} = 4$ (*2) | | $N_{pilot} = 8$ (*3) | | | | $N_{pilot} = 16$ (*4) | | | | | | | | $N_{pilot} = 4$ (*5) | |
|---|---|---|---|---|---|---|---|---|---|---|---|---|---|---|---|---|---|
| # | 0 | 0 | 1 | 0 | 1 | 2 | 3 | 0 | 1 | 2 | 3 | 4 | 5 | 6 | 7 | 0 | 1 |
| Slot #0 | 01 | 01 | 10 | 11 | 00 | 00 | 10 | 11 | 00 | 00 | 10 | 11 | 00 | 00 | 10 | 01 | 10 |
| 1 | 10 | 10 | 10 | 11 | 00 | 00 | 01 | 11 | 00 | 00 | 01 | 11 | 10 | 00 | 10 | 10 | 01 |
| 2 | 11 | 11 | 10 | 11 | 11 | 00 | 00 | 11 | 11 | 00 | 00 | 11 | 10 | 00 | 11 | 11 | 00 |
| 3 | 10 | 10 | 10 | 11 | 10 | 00 | 01 | 11 | 10 | 00 | 01 | 11 | 00 | 00 | 00 | 10 | 01 |
| 4 | 00 | 00 | 10 | 11 | 11 | 00 | 11 | 11 | 11 | 00 | 11 | 11 | 01 | 00 | 10 | 00 | 11 |
| 5 | 01 | 01 | 10 | 11 | 00 | 00 | 10 | 11 | 00 | 00 | 10 | 11 | 11 | 00 | 00 | 01 | 10 |
| 6 | 01 | 01 | 10 | 11 | 10 | 00 | 10 | 11 | 10 | 00 | 10 | 11 | 01 | 00 | 11 | 01 | 10 |
| 7 | 00 | 00 | 10 | 11 | 10 | 00 | 11 | 11 | 10 | 00 | 11 | 11 | 10 | 00 | 11 | 00 | 11 |
| 8 | 11 | 11 | 10 | 11 | 00 | 00 | 00 | 11 | 00 | 00 | 00 | 11 | 01 | 00 | 01 | 11 | 00 |
| 9 | 01 | 01 | 10 | 11 | 01 | 00 | 10 | 11 | 01 | 00 | 10 | 11 | 01 | 00 | 01 | 01 | 10 |
| 10 | 11 | 11 | 10 | 11 | 11 | 00 | 00 | 11 | 11 | 00 | 00 | 11 | 00 | 00 | 10 | 11 | 00 |
| 11 | 00 | 00 | 10 | 11 | 01 | 00 | 11 | 11 | 01 | 00 | 11 | 11 | 00 | 00 | 01 | 00 | 11 |
| 12 | 00 | 00 | 10 | 11 | 10 | 00 | 11 | 11 | 10 | 00 | 11 | 11 | 11 | 00 | 00 | 00 | 11 |
| 13 | 10 | 10 | 10 | 11 | 01 | 00 | 01 | 11 | 01 | 00 | 01 | 11 | 10 | 00 | 01 | 10 | 01 |
| 14 | 10 | 10 | 10 | 11 | 01 | 00 | 01 | 11 | 01 | 00 | 01 | 11 | 11 | 00 | 11 | 10 | 01 |

The most important factor for controlling overall performance of a mobile telecommunication system using the W-CDMA scheme is the power control (PC) function of the DPCH. Therefore, rapid TPC transmit power control (TPC) is generally needed, as prescribed in the UMTS standard TS 25.211& TS 25.214. In order to increase the number of UEs a Node B can handle (i.e., the accommodation capability), a transmission signal from the Node B is preferably maintained at or greater than a predetermined threshold value at each reception end of the UEs, and signals transmitted from each UE should not be affected by interference. Therefore, the UE adjusts its own TP using a TPC symbol received over a TPC field of a downlink DPCCH transmitted from the Node B, calculates a signal to interference ratio (SIR) of the reception signal using pilot symbols received over the pilot field, produces TPC information of the Node B using the calculated SIR, and reports the TPC information to the Node B in such a way that the Node B adjusts a TP value of the UE.

A power control (PC) timing of the DPCH will hereinafter be described with reference to FIG. 4.

FIG. 4 is a view illustrating a PC timing diagram of the DPCH.

Referring to FIG. 4, if a UMTS terrestrial radio access network (UTRAN) transmits a downlink DPCCH signal (DL_DPCCH at UTRAN), the UE experiences a propagation delay for a predetermined time before receiving the downlink DPCCH signal (DL_DPCCH at UTRAN) from the UTRAN. The UE receiving the downlink DPCCH signal from the UTRAN reads out the TPC field of the downlink DPCCH, and modifies its TP (Transmit Power) value according to the corresponding received TPC command. The UE reads out the pilot field of the downlink DPCCH to calculate the SIR of the reception signal, determines on the basis of the calculated SIR whether or not the TP of the UTRAN should be adjusted, and transmits the determination result to the UTRAN over a TPC field of an uplink DPCCH (UL_DPCCH at UE). In this case, the UE transmits the uplink DPCCH signal (UL_DPCCH at UE) to the UTRAN at the controlled TP value. The UTRAN receives the uplink DPCCH signal (UL_DPCCH at UE) from the UE after a lapse of a predetermined time, i.e., due to propagation delay of the uplink DPCCH signal (UL_DPCCH at UE). The uplink DPCCH signal (UL_DPCCH at UE) contains the UTRAN's TPC information calculated by the UE. However, in order to meet the 1-slot delay PC (Power Control) regulation prescribed in the 3GPP (3rd Generation Partnership Project) while performing the above DPCH PC function, the total delay time should be within a specified time limit of 512 chips. This specified time limit takes into account the multi-path delay time and process delay time for performance of the PC function on the basis of an antenna end. Therefore, if the total delay time is longer than the specified time of 512 chips, the 1-slot delay PC becomes impossible, resulting in deterioration of system performance.

Signals transmitted over the pilot and TPC fields of the DPCCH used for the downlink DPCH PC are STTD-encoded as described above, such that the UE must perform the STTD encoding when demodulating the signals transmitted over the pilot and TPC fields of the DPCCH. An apparatus for demodulating the STTD-encoded DPCCH signals will hereinafter be described with reference to FIG. 5.

FIG. 5 is a view illustrating an internal configuration of a conventional apparatus for demodulating a STTD-encoded DPCH signal.

Referring to FIG. 5, if the DPCH signal is STTD-encoded and transmitted as described above, the STTD-encoded DPCH signal is received over a UE antenna (not shown), and then the received DPCH signal enters an STTD decoder 511. The STTD decoder 511 receives the DPCH signal, decodes it with the STTD decoding scheme corresponding to the STTD encoding scheme used in the UTRAN, and then generates the decoded DPCH signal. The STTD-decoded DPCH signal generated from the STTD decoder 511 enters a data demodulator and a DPCCH processor 513. The DPCCH processor 513 receives the DPCCH signal among the STTD-decoded DPCH signals as an input, and processes TPC and pilot symbols transmitted over the TPC and pilot fields. The TPC and pilot symbols generated from the DPCCH processor 513 are considered as measurement values of the DPCH signal. As a result, the UE recognizes a SIR value of a signal received over the DPCH on the basis of the pilot symbol, and recognizes its own TP control value on the basis of the TPC symbol. Thereafter, the UE generates a TPC command to be transmitted over the TPC field of the uplink DPCCH, and transmits the TPC command to the UTRAN over the TPC field such that a TPC process is correctly established. A timing diagram for the DPCH signal demodulation process will hereinafter be described with reference to FIG. 6.

FIG. 6 is a view illustrating a timing diagram for the DPCH signal demodulation process shown in FIG. 5.

For the convenience of description and better understanding of the present invention, a pilot signal received over the pilot field among a plurality of DPCH signals is adapted as an example in reference to FIG. 6. Referring to FIG. 6, a signal received over the pilot field, i.e., a pilot signal, enters the STTD decoder 511 at a certain time, for example, at time t=0 which is shown on the time axis (t). The pilot signal is STTD-decoded by the STTD decoder 511 and outputted at a certain time, for example, at time t1, also shown on the time axis. The SIR value of the received DPCH signal is calculated using the STTD-decoded pilot signal. A TPC command for executing a PC process of the UE is produced using the calculated SIR value at a certain time, for example, at time t2, also shown on the time axis. As can be seen from FIG. 6, the STTD decoding unavoidably causes a delay time of t1.

It can be seen that, therefore, given that the STTD decoding is adapted to process signals transmitted over the pilot and TPC fields of the DPCH, the total delay time becomes longer in the PC process, resulting in deterioration of system performance.

SUMMARY OF THE INVENTION

An object of the present invention is to substantially solve at least the above problems and/or disadvantages, and to provide at least the advantages described below. Therefore, the present invention has been made in view of the above problems, and it is an object of the present invention to provide a channel demodulation apparatus for minimising a PC delay time in a CDMA communication system, and a method for controlling the same.

It is another object of the present invention to provide an apparatus and method for demodulating a STTD-encoded channel signal in a CDMA communication system.

It is yet another object of the present invention to provide an apparatus and method for demodulating STTD-encoded PC information in a CDMA communication system.

In accordance with one aspect of the present invention, the above and other objects can be accomplished by an apparatus for receiving PC information in a communication system wherein a transmitter with first and second antennas STTD-encodes a channel signal having the PC information of a receiver and transmits a STTD-encoded result over the first and second antennas, wherein the apparatus comprises a first antenna signal processor for receiving a signal transmitted from the transmitter, and processing the received signal as a signal transmitted from the first antenna using a first pattern and a second antenna signal processor for processing the received signal as a signal transmitted from the second antenna using a second pattern orthogonal to the first pattern. The apparatus for receiving PC information in a communication system and encoding and transmitting an STTD encoded signal further comprises an adder for combining an output signal of the first antenna signal processor with an output signal of the second antenna signal processor, and generating the PC information.

Another aspect of the present invention provides an apparatus for receiving PC information in a communication system wherein a transmitter with first and second antennas STTD-encodes the PC information of a receiver along with adjacent data information, and transmits the STTD-encoded channel signal over the first and second antennas, wherein the apparatus comprises an STTD decoder for receiving a signal transmitted from the transmitter, receiving a first compensation signal channel-compensated with a first antenna channel estimation value and a second compensation signal channel-compensated with a first antenna channel estimation value, decoding the first compensation signal and the second compensation signal, and sequentially generating a plurality of information in the order from last-in (LI) information to first-in (FI) information. The apparatus further comprises a multiplier for detecting the PC information using an output signal of the STTD decoder and a first pattern.

Still another aspect of the present invention provides a method for receiving PC information in a communication system wherein a transmitter with first and second antennas STTD-encodes a channel having the PC information of a receiver and transmits a STTD-encoded result over the first and second antennas, wherein the method comprises receiving a signal transmitted from the transmitter, and processing the received signal as a signal transmitted from the first antenna using a first pattern, processing the received signal as a signal transmitted from the second antenna using a second pattern orthogonal to the first pattern and combining a result signal of the receiving step with the resultant signal of the processing step, and generating the PC information.

A further aspect of the present invention provides a method for receiving PC information in a communication system wherein a transmitter with first and second antennas STTD-encodes PC information of a receiver along with adjacent data information, and transmits the STTD-encoded channel signal over the first and second antennas, wherein the method comprises receiving a signal transmitted from the transmitter, receiving a first compensation signal channel-compensated with a first antenna channel estimation value and a second compensation signal channel-compensated with a first antenna channel estimation value, decoding the first compensation signal and the second compensation signal, and sequentially generating a plurality of information in the order from LI information to FI information,; and subsequently detecting the PC information using a STTD-decoded signal and a first pattern.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
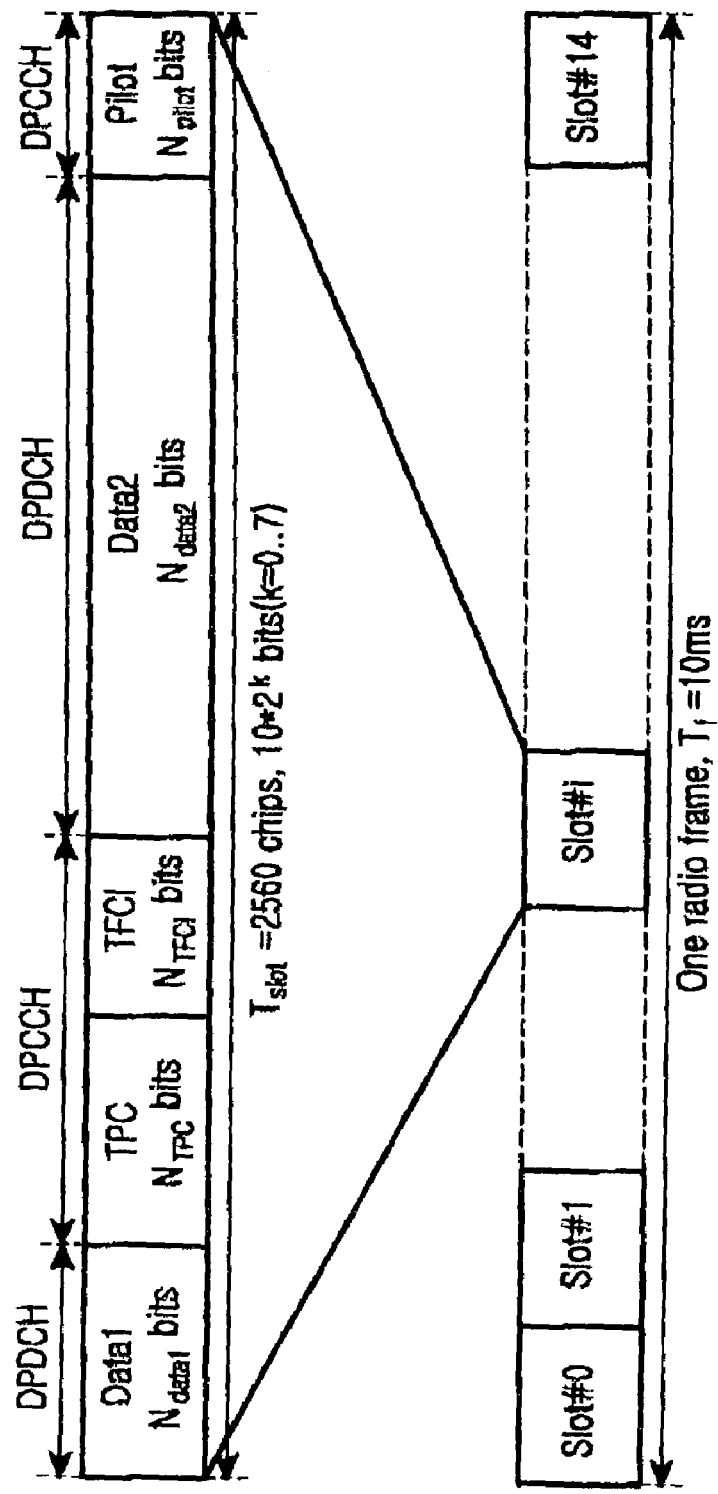
FIG. 1 is a view illustrating a configuration of a downlink DPCH of a mobile telecommunication system.
Figure 2:
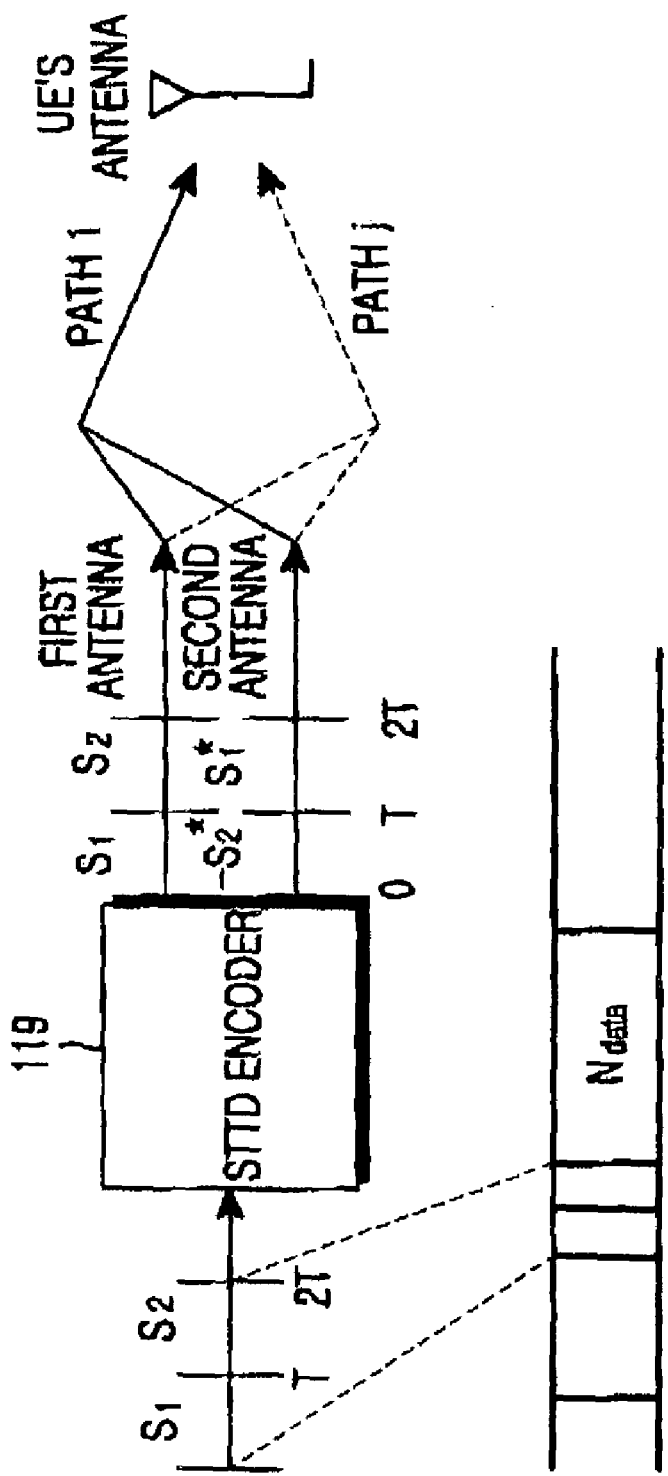
FIG. 2 is a view illustrating a channel encoding process using an STTD encoder.
Figure 3:
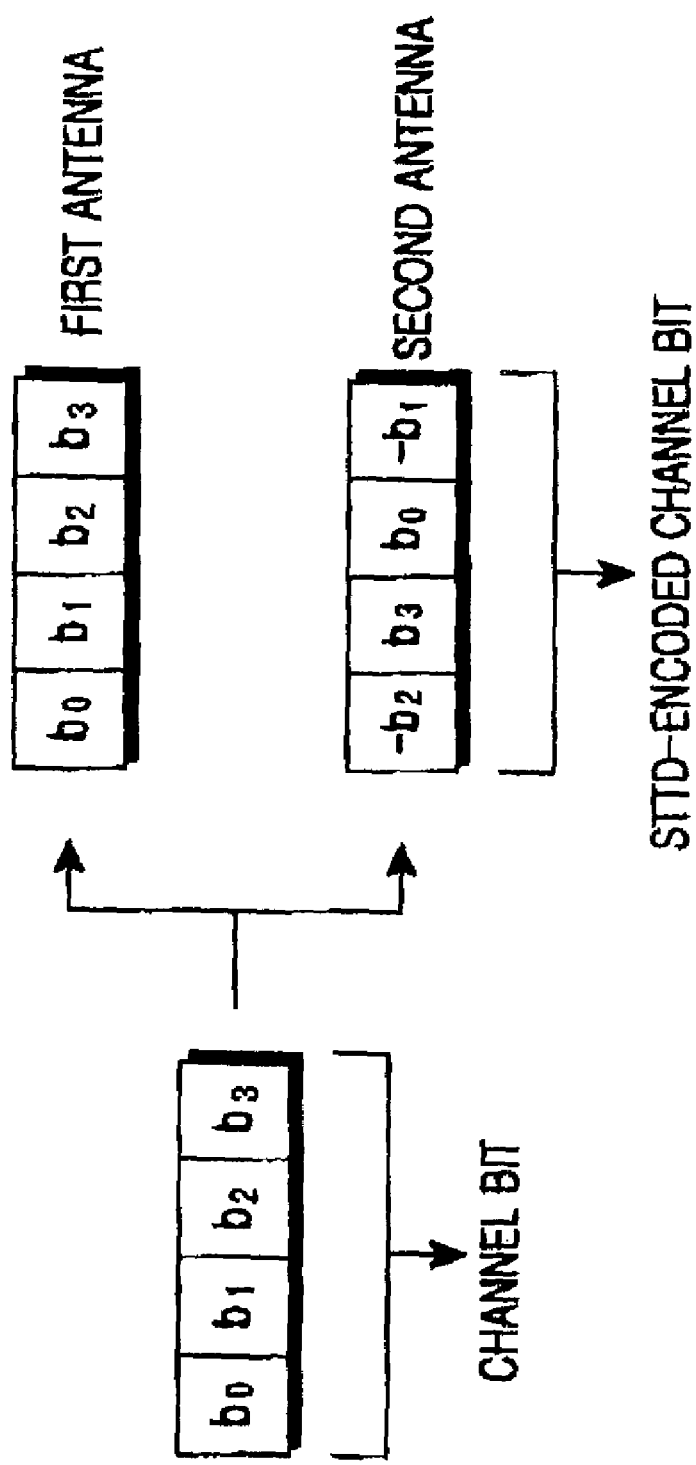
FIG. 3 is a view illustrating a channel information bit encoding process via the STTD encoder shown in FIG. 2.
Figure 4:
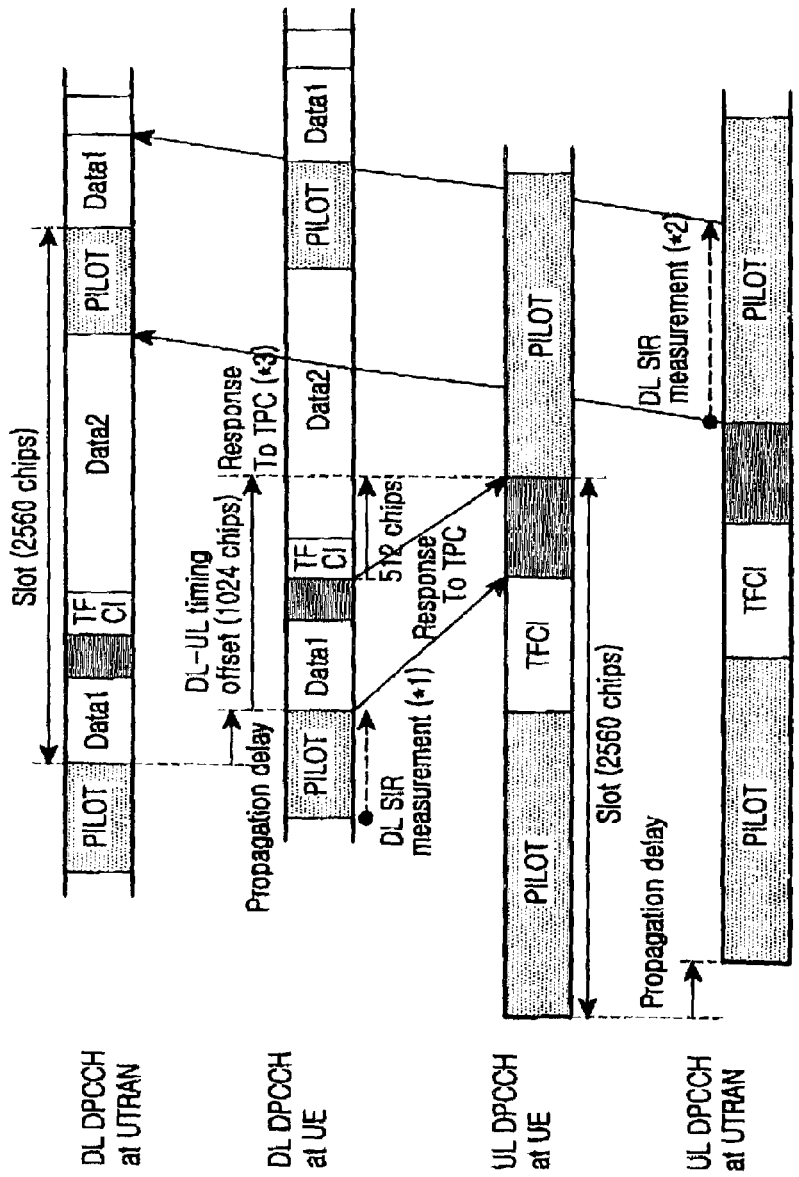
FIG. 4 is a view illustrating a general PC (Power Control) timing diagram of a general DPCH.

Several preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein have been omitted for conciseness.

Figure 7:
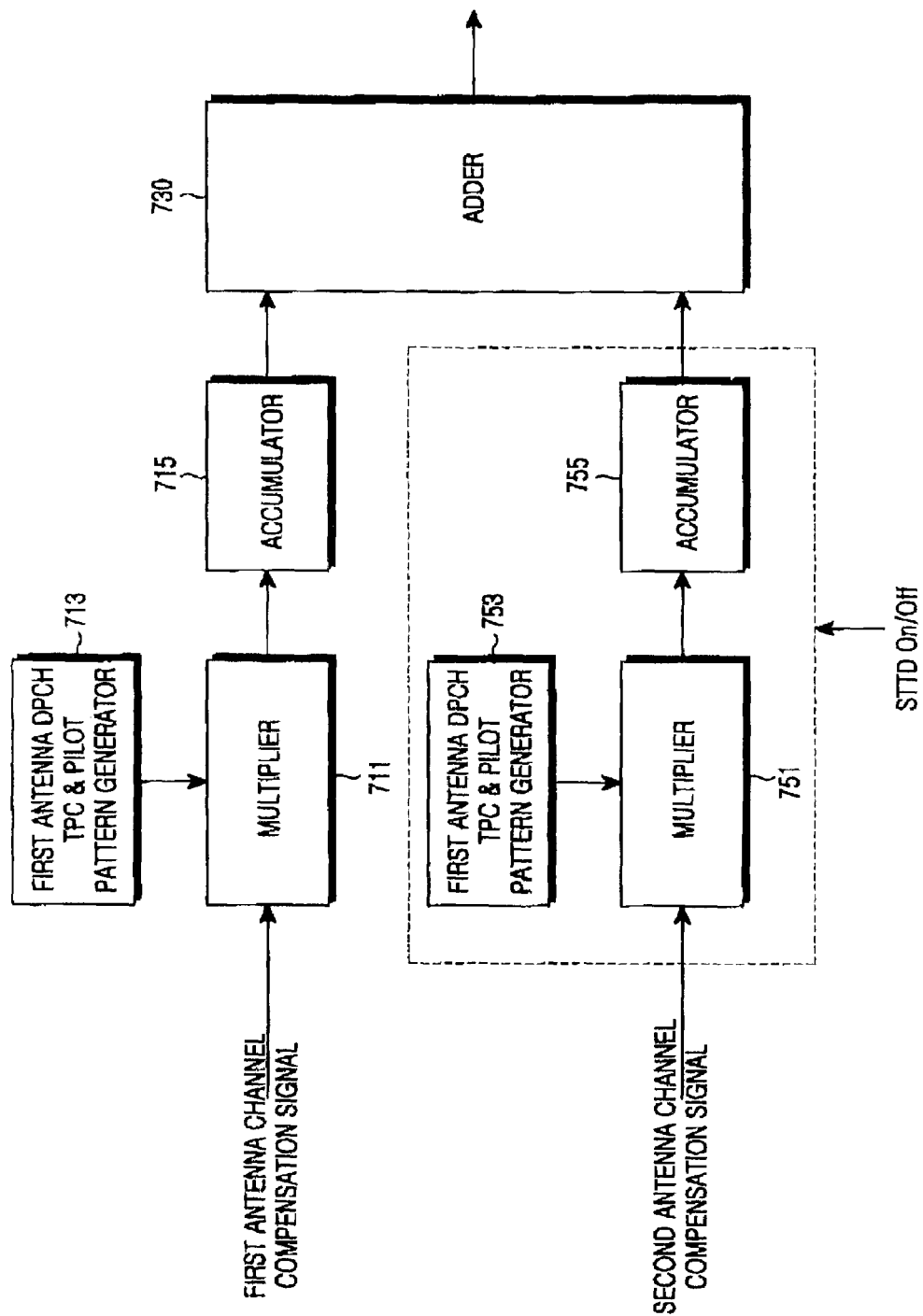
FIG. 7 is a view illustrating an internal configuration of an apparatus for demodulating a STTD-encoded DPCH signal in accordance with an embodiment of the present invention.

FIG. 7 is a view illustrating an internal configuration of an apparatus for demodulating a STTD-encoded DPCH signal in accordance with a preferred embodiment of the present invention.

With regards to the following detailed description of FIG. 7, it is assumed that a Node B transmits a channel signal over two transmit (Tx) diversity antennas, i.e., a first antenna (ANT 1) and a second antenna (ANT 2) and a DPCH has the same slot format as shown and described with regard to FIG. 1. FIG. 7 is applied to a DPCH signal process on the assumption that the number of TPC bits transmitted over a DPCCH TPC field, and the number of pilot bits transmitted over a pilot field on the DPCH slot format are respectively at least multiples of 4 such as 4, 8, or 16.

Referring to FIG. 7, a DPCH signal transmitted over the two antennas of a Node B is received at a UE's antenna, and the received signal is subsequently channel-compensated. The UE channel-compensates the signal received from the antenna with a channel estimation value of the signal transmitted via the first antenna of the Node B and then with a channel estimation value of the signal transmitted via a second antenna of the Node B. In this case, the reception signal compensated with the first antenna's channel estimation value is defined as a first antenna channel compensation signal (ANT 1 compensated signal), and the other reception signal compensated with the second antenna's channel estimation value is defined as a second antenna channel compensation signal (ANT 2 compensated signal). Although the first and second antenna channel compensation signals are channel-compensated, they are not yet classified into a first transmission signal from the first antenna of the Node B and a second transmission signal from the second antenna of the Node B.

When the first antenna channel compensation signal and the second antenna channel compensation signal enter the apparatus shown in FIG. 7, a demultiplexer DEMUX (not shown) separates the TPC field signal from the pilot field signal of the DPCH, outputs the separated result to a multiplier 711, and outputs a TPC field signal and a pilot field signal separated from the second antenna channel compensation signal to a multiplier 751. In this case, the TPC field signal and the pilot field signal are equal to each other, i.e., the TPC symbol processing method is the same as a pilot symbol processing method. A pilot symbol composed of 4 bits is adapted as an example for the convenience of description and a better understanding of the present invention. The above signals entering the multiplier 711 and the multiplier 751 are pilot signals received over the pilot field.

When the pilot signal enters the multiplier 711, the multiplier 711 multiplies the antenna pilot patterns produced from the first antenna DPCH TPC and pilot pattern generator 713, by the received pilot signal, and outputs the product to an accumulator 715. In this case, the first antenna pilot patterns produced from the first antenna DPCH TPC and pilot pattern generator 713 are orthogonal to each other as can be seen from the aforementioned Tables 1 and 2. Particularly, because a pilot symbol composed of 4 bits is adapted as an example in FIG. 7, the first antenna DPCH TPC and pilot pattern generator 713 outputs the first antenna pilot patterns with $N_{pilot}$ equal to 4, shown in Table 1, to the multiplier 711. The accumulator 715 accumulates the output signals of the multiplier 711, i.e., signals having no first antenna pattern, during the pilot field section, and then outputs the accumulated result to an adder 730.

In the meantime, as the pilot signal enters the multiplier 751, the multiplier 751 multiplies second antenna pilot patterns produced from a second antenna DPCH TPC and pilot pattern generator 753 by the received pilot signal, and outputs the product to an accumulator 755. In this case, the second antenna pilot patterns produced from the second antenna DPCH TPC and pilot pattern generator 753 are the same as second antenna pilot patterns used in the Node B, i.e., the aforementioned second antenna pilot patterns shown in Table 2. Particularly, because a pilot symbol composed of 4 bits is adapted as an example in FIG. 7, the second antenna DPCH TPC and pilot pattern generator 753 outputs the second antenna pilot patterns with $N_{pilot}$ equal to 4, as shown in Table 2, to the multiplier 751. The accumulator 755 accumulates the output signals of the multiplier 751, i.e., signals having no second antenna pattern, during the pilot field section, and then outputs the accumulated result to an adder 730. In this case, the first antenna pilot signals are orthogonal to the second antenna pilot signals. Therefore, as the accumulator 715 accumulates the output signals of the multiplier 711 during the pilot field section, the accumulator 715 generates accumulated pilot signal values for every antenna due to such orthogonality between the first and second antenna pilot signals.

The adder 730 then combines the output signal of the accumulator 715 with the output signal of the accumulator 755, and generates a signal for generating a TPC command. A controller (not shown) provides a variety of information for use in the encoding process. For example, the processor provides information for indicating whether the Node B transmits a DPCH signal according to the STTD encoding, and information for indicating the number of pilot bits and the number of TPC bits. In the case where the Node B does not STTD-encode the DPCH signal, a plurality of components associated with the second antenna, i.e., the multiplier 751, the second antenna DPCH TPC and pilot pattern generator 753, the accumulator 755, and the adder 730, are not used as a result of an STTD On/Off signal generated by the controller. This is possible because the Node B does not STTD-encode the DPCH signal and thereby has no signal transmitted over the second antenna. In this manner, the DPCH signal processor shown in FIG. 7 does not STTD-decode the TPC and pilot signals, but directly processes them, thereby removing the delay time caused by the STTD decoding.

FIG. 7 illustrates a DPCH signal demodulation process on the assumption that a signal transmitted over the TPC field and the pilot field is composed of more than 4 bits. A DPCH signal processor will hereinafter be described with reference to FIG. 8, taking as an example the case where the signal transmitted over the TPC field and the pilot field is composed of 2 bits.

Figure 8:
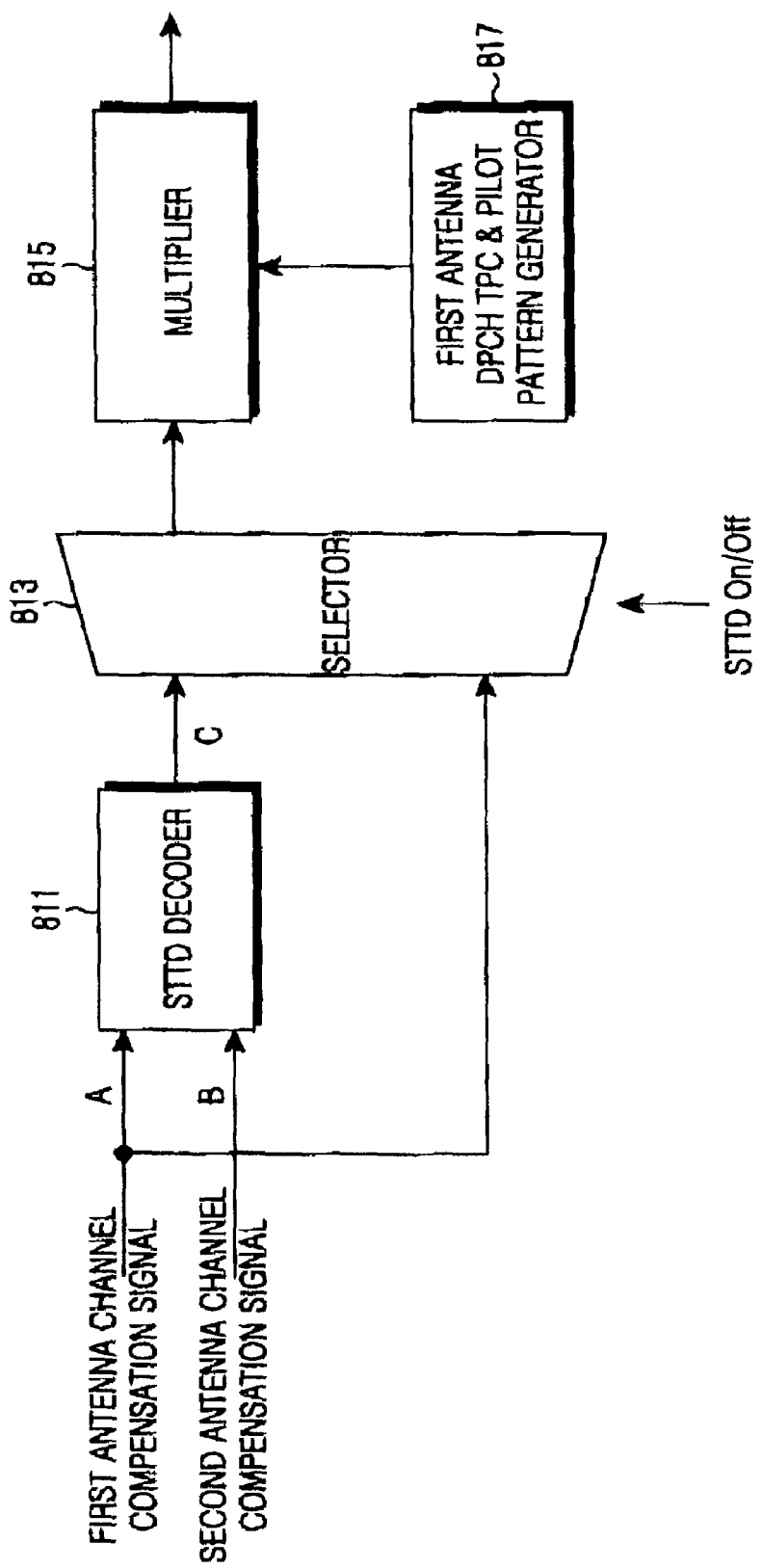
FIG. 8 is a view illustrating an internal configuration of an apparatus for demodulating a STTD-encoded DPCH signal in accordance with another embodiment of the present invention.

FIG. 8 is a view illustrating an internal configuration of an apparatus for demodulating a STTD-encoded DPCH signal in accordance with another preferred embodiment of the present invention.

With regards to the following detailed description of FIG. 8, it is assumed that the number of TPC bits transmitted over the TPC field on the DPCH slot format is 2 and the number of pilot bits transmitted over the pilot field on the DPCH slot format is also 2. FIG. 8 illustrates a DPCH signal process based on this assumption. The TPC field signal processing method is the same as the pilot signal processing method, such that a pilot signal composed of 2 bits is adapted as an example for the convenience of description and better understanding of the present invention. The reason why the pilot signal composed of 2 bits is adapted to an additional new DPCH signal processor instead of the DPCH signal processor shown in FIG. 7, is that the pilot bits composed of 2 bits and data bits of an adjacent Data2 field are all used for the STTD encoding of the Node B, on the condition that the number of the pilot bits is 2. Likewise, if the STTD encoding is applied to the pilot bits using the data bits, the position of the pilot bits of the first antenna is different from that of the pilot bits of the second antenna, and therefore it is impossible to identify a pattern of the data bits. This loss of the ability to identify the pattern of data bits results in the loss of orthogonality between signals transmitted over the first and second antennas.

Referring to FIG. 8, in the case of processing a DPCH signal with a pilot field having pilot bits composed of 2 bits, the situation in which the STTD encoding is applied is different from the other case where the STTD encoding is not applied. In the case where the STTD encoding is not applied, a DPCH signal received over the first antenna by the STTD On/Off signal of a controller (not shown) does not enter a STTD encoder 811, but directly enters a multiplier 815. On the contrary, in the case where the STTD encoding is applied, the apparatus shown in FIG. 8 will be operated as follows. If the number of pilot bits transmitted over the pilot field is 2, a transmission end STTD-encodes the pilot bits with the last symbol of data bits transmitted over the Data2 field adjacent to the pilot field (i.e., with the data bits of 2 bits), and transmits the STTD-encoded result.

In the same manner as FIG. 7, therefore, a DPCH signal transmitted over the two antennas of Node B is received at a UE's antenna, and the received signal of the UE's antenna is channel-compensated. The DPCH signal received over the antenna is channel-compensated with a channel estimation value of the signal transmitted via the first antenna of the Node B and a channel estimation value of the signal transmitted via the second antenna of the Node B. In this case, the signal compensated with the first antenna's channel estimation value is defined as a first antenna channel compensation signal (ANT 1 compensated signal), and the other signal compensated with the second antenna's channel estimation value is defined as a second antenna channel compensation signal (ANT 2 compensated signal). Although the first and second antenna channel compensation signals are channel-compensated, they are not yet classified into a transmission signal from the first antenna and the other transmission signal from the second antenna. In this way, if the first antenna channel compensation signal and the second antenna channel compensation signal enter the apparatus shown in FIG. 8, a demultiplexer DEMUX (not shown) separates only the pilot field signal of the DPCH from the received signals, outputs the pilot field signal separated from the first antenna channel compensation signal to the STTD decoder 811 and a selector 813, and outputs the pilot field signal separated from the second antenna channel compensation signal to the STTD decoder 811.

Referring to FIG. 8, the STTD decoder 811 receives the first antenna channel compensation signal and the second antenna channel compensation signal, STTD-decodes the received signals, and outputs the STTD-decoded signals to the selector 813. In this case, wherein the STTD decoder 811 outputs the STTD-decoded signals using the first antenna channel compensation signal and the second antenna channel compensation signal, the STTD-encoded signals are generated in the opposite order of signal entry times. For example, provided that the first antenna channel compensation signal receives a data symbol before receiving a pilot symbol, the second antenna channel compensation signal receives a pilot symbol first and then the data symbol. As a result, in the case where the first antenna channel compensation signal and the second antenna channel compensation signal are STTD-decoded, and the data symbol and the pilot symbol are sequentially generated from the STTD decoder 811 in the order of signal entry times. However, because the signal to be currently demodulated is not a data signal but a pilot signal, the pilot signal should be demodulated first and outputted from the STTD decoder 811. Therefore, when the STTD decoder 811 generates its own output signals according to the STTD decoding scheme, the initial signal output order (i.e., data symbol → pilot symbol) is replaced with a new signal output order (i.e., pilot symbol → data symbol).

In the meantime, a controller (not shown) provides a variety of information for use in the encoding process. For example, the processor provides information indicating whether or not the Node B transmits a DPCH signal according to the STTD encoding scheme and information indicating the number of pilot bits and the number of TPC bits. Provided that the Node B does not STTD-encode the DPCH signal, the STTD decoder 811 is not enabled because there is no need to perform the STTD decoding. The Node B does not STTD-encode the DPCH signal and therefore has only a signal transmitted over the first antenna, resulting in useless STTD decoding. If the DPCH signal is not STTD-encoded under the control of the controller, the selector 813 selects only the first antenna channel compensation signal and outputs it to a multiplier 815. If the DPCH signal is STTD-encoded, the selector 813 selects only the output signal of the STTD decoder 811 and outputs it to the multiplier 815. Upon receiving the output signal of the selector 813, the multiplier 815 multiplies the first antenna pilot patterns generated from a first antenna DPCH TPC and pilot pattern generator 817 by the output signal of the selector 813 in order to process the pilot signal. In this case, the first antenna pilot patterns generated from the first antenna DPCH TPC and pilot pattern generator 817 are a conjugate of Node B's first antenna pilot patterns, which are equal to the first antenna pilot patterns shown in the Table 1. In particular, a pilot symbol of 2 bits is adapted as an example in FIG. 8 such that the first antenna DPCH TPC and pilot pattern generator 817 outputs a conjugate of the first antenna pilot patterns to the multiplier 815 when $N_{pilot}$ equals 2 as shown in Table 1.

Similarly, the TPC signal adapts the same method as the pilot signal. The TPC pattern is not additionally prescribed in any standard, whereas the pilot pattern associated with each Node B's transmission antenna is prescribed in the UMTS standard TS 25.211. Therefore, the TPC pattern associated with the first antenna should be found. The TPC signal always transmits the same bits during a slot section. In this case, the most important thing is a TPC signal's sign rather than a TPC signal's bit value. So, provided that the sign of the TPC signal is not considered, the TPC pattern of the first antenna is composed of bits each always having a value of 1. A TPC pattern of the second antenna is obtained by STTD-encoding the TPC pattern of the first antenna. Provided that the STTD encoding is applied to the bits of the TPC field, the bit pattern transmitted over the TPC field is shown in Table 3.

A timing diagram of the I/O signals accompanied with the STTD decoding of the STTD decoder 811 will hereinafter be described with reference to FIG. 9.

Figure 9:
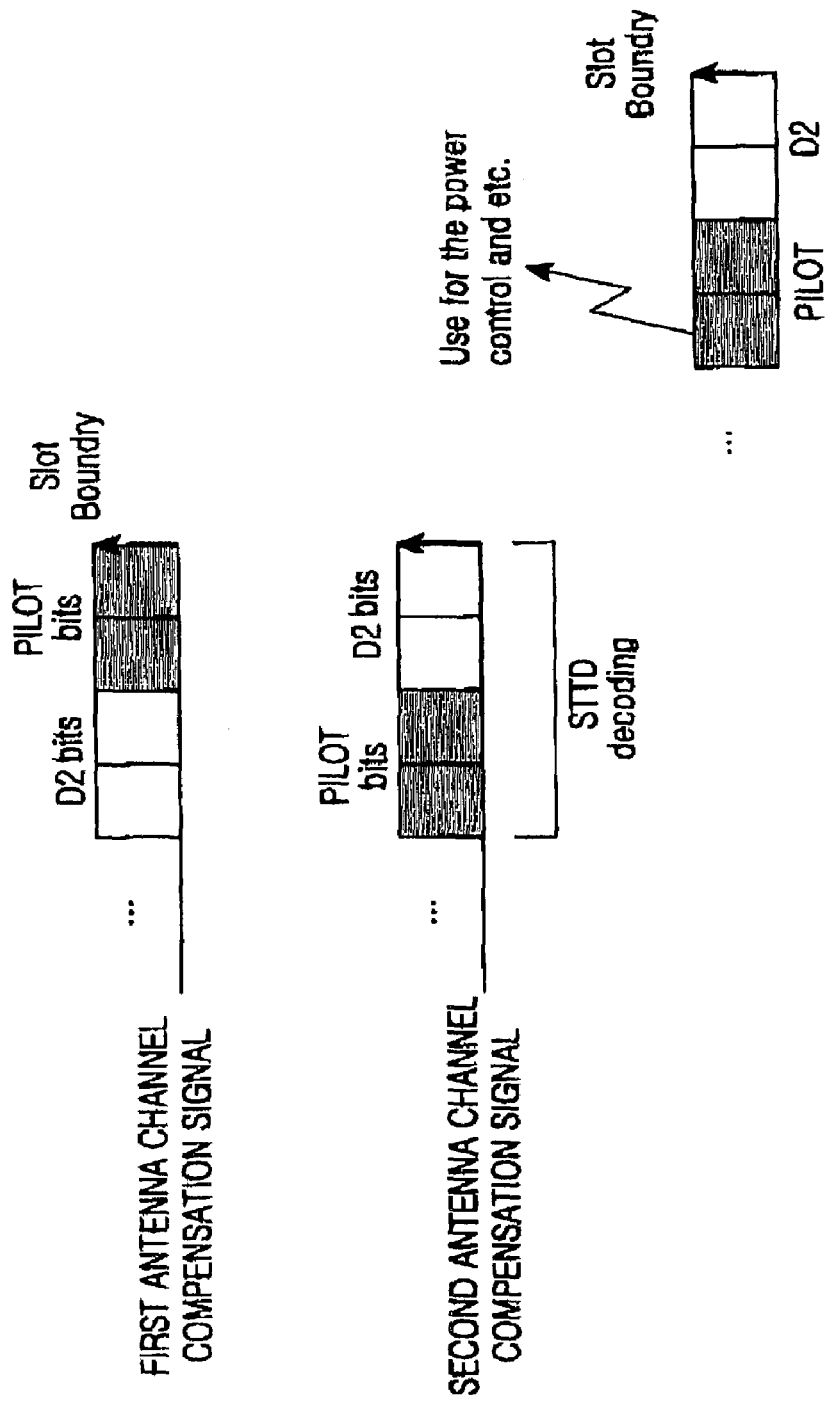
FIG. 9 is a view illustrating a timing diagram of input/output (I/O) signals used in a DPCH signal demodulation process of the STTD decoder shown in FIG. 8.

FIG. 9 is a view illustrating a timing diagram of I/O signals accompanied with the DPCH signal demodulation process of the STTD decoder 811 shown in FIG. 8.

FIG. 9 illustrates a plurality of reception signals, i.e., a first antenna channel compensation signal at point A (shown in FIG. 8) and a second antenna channel compensation signal at point B (shown also in FIG. 8), of the STTD decoder 811 of FIG. 8. , . As stated above, the first antenna channel compensation signal has a specific form wherein the data signal and pilot signal are sequentially received, and the second antenna channel compensation signal has different specific form wherein the pilot signal and data signal are sequentially received. If the first antenna channel compensation signal and the second antenna channel compensation signal enter the STTD decoder 811, the STTD decoder 811 STTD-decodes the first and second antenna channel compensation signals. The STTD decoder 811 generates an output signal form of the order of a pilot signal → a data signal at a point C shown in FIG. 8. As a result, it is possible to process only necessary pilot symbols.

According to the preferred embodiment of the present invention, there is no need to perform an additional STTD decoding corresponding to the STTD encoding even though an STTD-encoded DPCH signal is received. This then results in quickly detecting the pilot and TPC signals of the DPCH signal. Therefore, a DPCH signal processor according to an embodiment of the present invention quickly performs a DPCH PC function using the detected pilot and TPC signals. Such a DPCH signal processor will be compared with the conventional DPCH demodulator with reference to FIG. 10, and a timing diagram associated with such DPCH signal demodulation process will be described with reference to FIG. 11.

Figure 10:
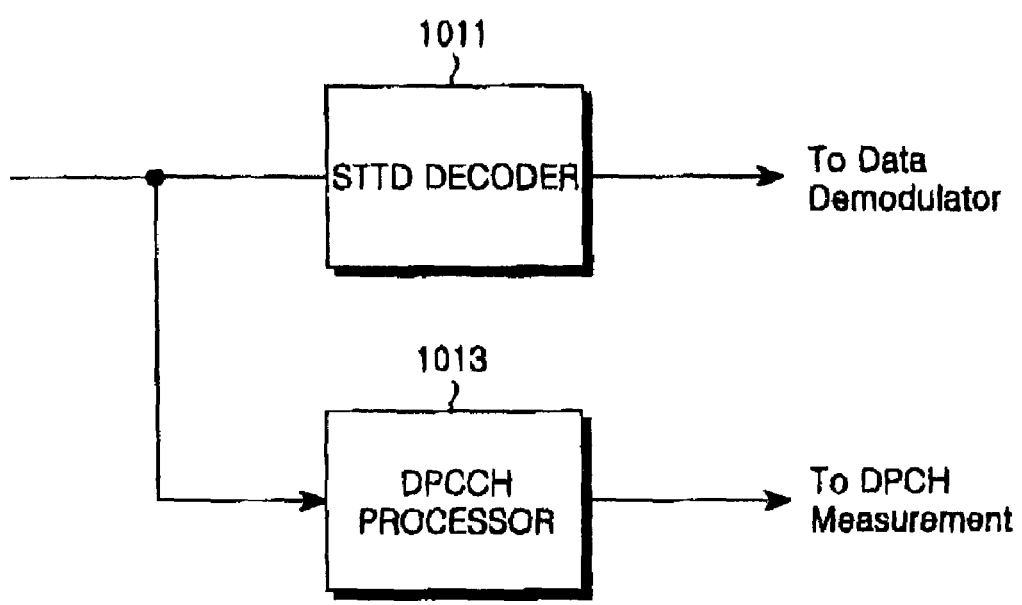
FIG. 10 is a view illustrating an internal configuration of an apparatus for demodulating a STTD-encoded DPCH signal in accordance with an embodiment of the present invention.

FIG. 10 is a view illustrating an internal configuration of an apparatus for demodulating a STTD-encoded DPCH signal in accordance with a preferred embodiment of the present invention.

Figure 5:
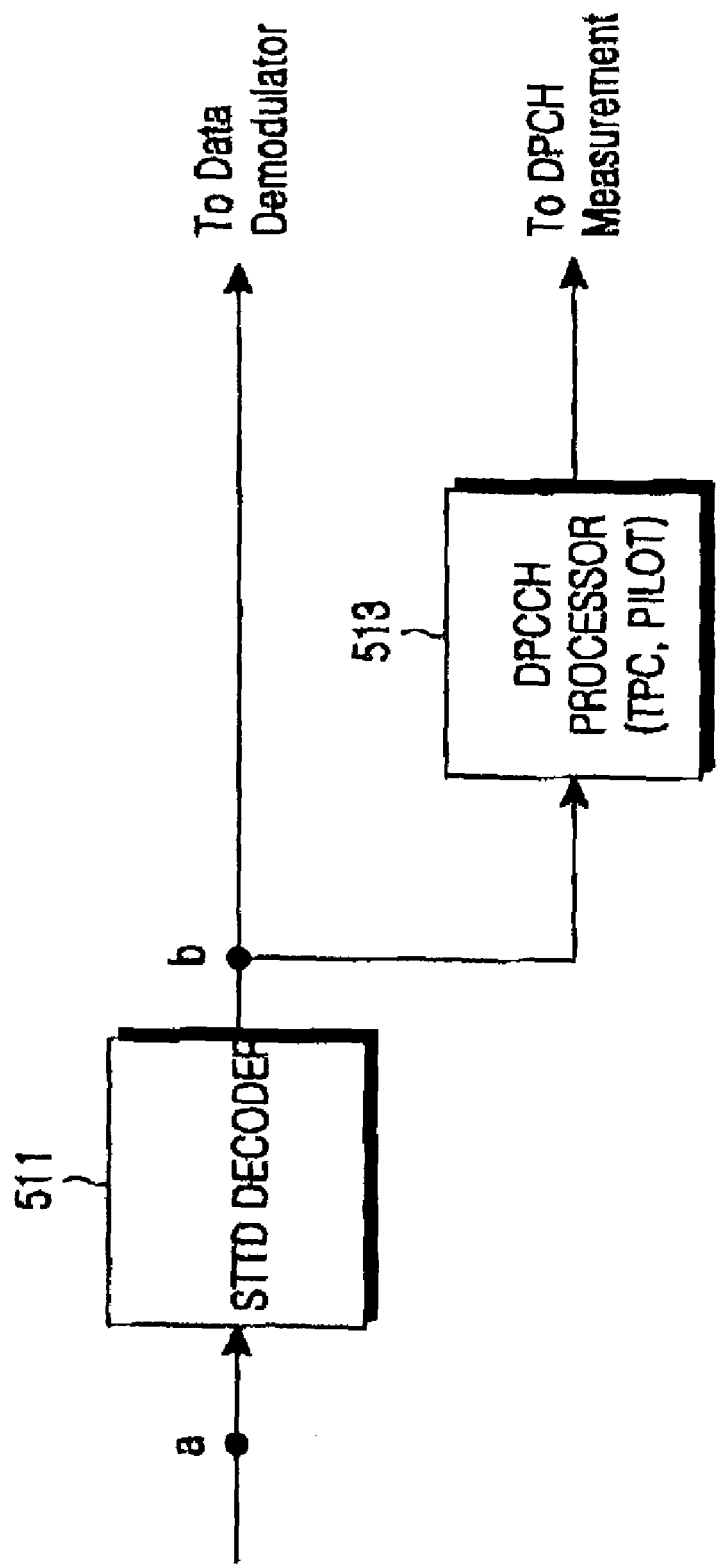
FIG. 5 is a view illustrating an internal configuration of a conventional apparatus for demodulating a STTD-encoded DPCH signal.
Figure 6:
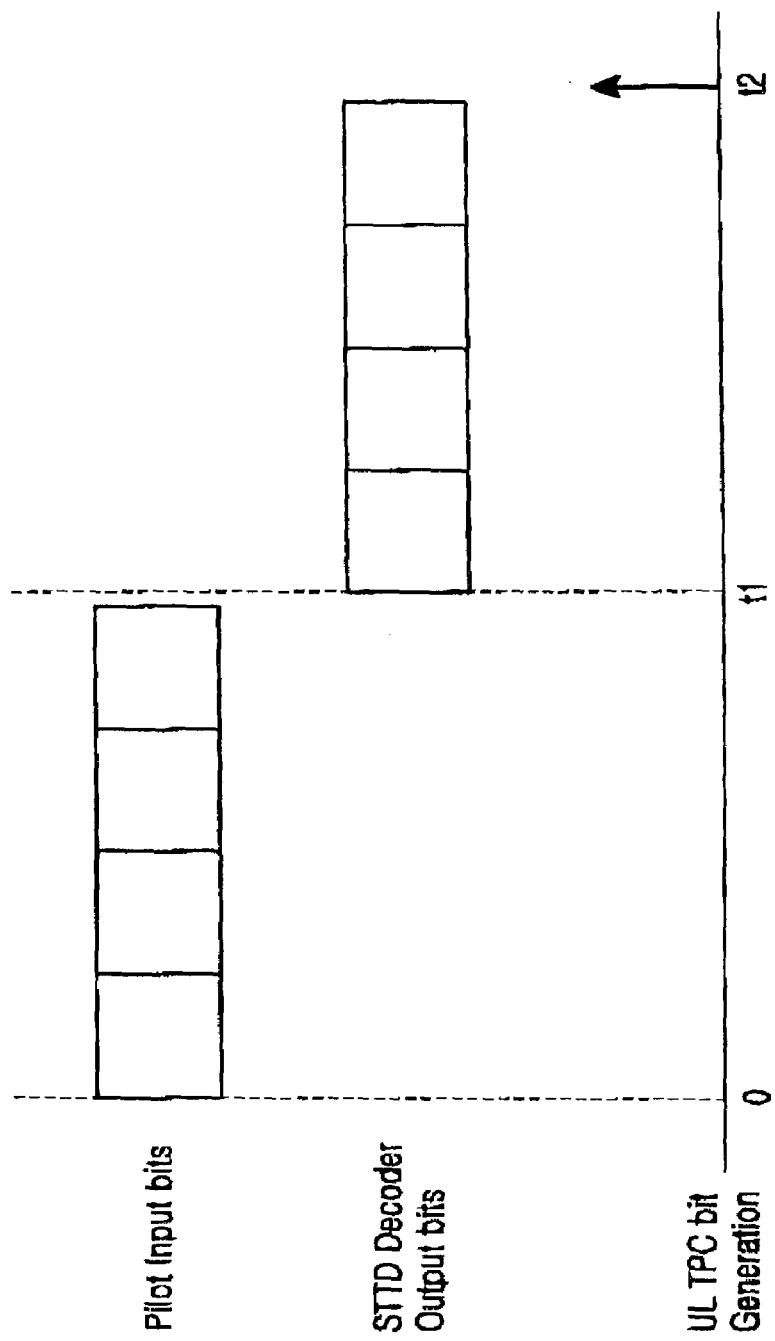
FIG. 6 is a view illustrating a timing diagram for the DPCH signal demodulation process shown in FIG. 5.

The components shown in FIG. 10 are operated in the same manner as previously described in FIGS. 7 through 8. However, the components of FIG. 10 are depicted generally in order to be compared with the conventional DPCH signal demodulator shown in FIG. 5 (which depicts the conventional art). Referring to FIG. 10, if the STTD encoding is applied to the DPCH signal and the STTD-encoded DPCH signal is transmitted, the STTD-encoded DPCH signal is received over a UE's antenna (not shown) and the received DPCH signal enters the STTD decoder 1011. The STTD decoder 1011 receives the DPCH signal, decodes it according to the STTD decoding scheme corresponding to the STTD encoding scheme of the Node B, and then outputs the decoded result to a demodulator (not shown). In the meantime, a DPCCH processor 1013 receives a DPCCH signal among the received DPCH signals, and processes the TPC and pilot symbols respectively transmitted over the TPC and pilot fields on the basis of the received DPCCH signal. In

TABLE 3

| The number of TPC bits within one slot | | | | | | | | | | | | | | |
|---|---|---|---|---|---|---|---|---|---|---|---|---|---|---|
| 2 | | 4 | | | 8 | | | | | | | | | |
| ANT1 | 1 | 1 | 1 | 1 | 1 | 1 | 1 | 1 | 1 | 1 | 1 | 1 | 1 | 1 |
| ANT2 | – | | –1 | 1 | 1 | –1 | –1 | 1 | 1 | –1 | –1 | 1 | 1 | –1 | this case, the DPCCH processor 1013 is operated in the same manner as in FIGS. 7 through 8. TPC and pilot signals generated from the DPCCH processor 1013 are adapted to detect a measurement value of the DPCH signal.

A DPCCH processor according to an embodiment of the present invention directly processes the TPC and pilot signals without performing an additional STTD decoding even though the Node B transmits a DPCH signal according to the STTD encoding scheme, thereby removing the time required for the STTD decoding. A timing diagram associated with the DPCH signal demodulation process will be described with reference to FIG. 11.

Figure 11:
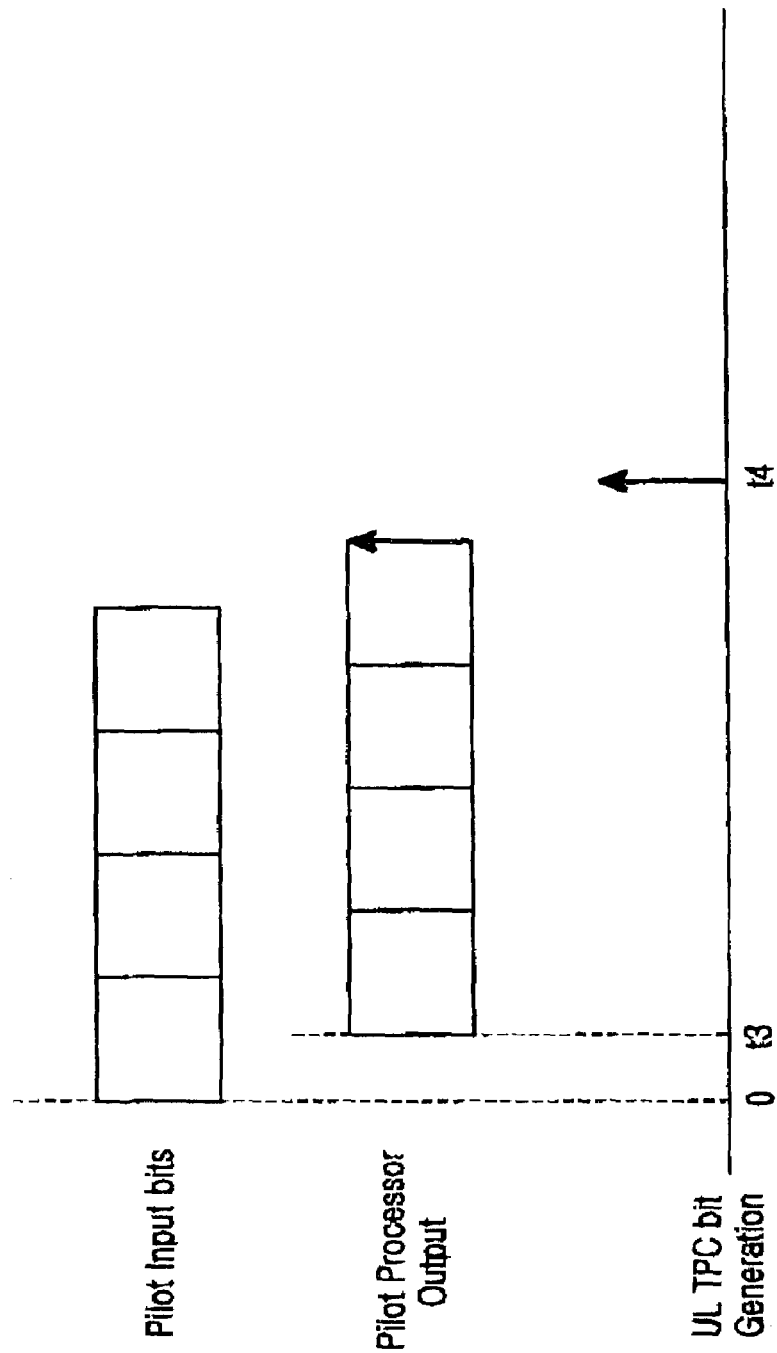
FIG. 11 is a view illustrating a timing diagram for the DPCH signal demodulation process shown in FIG. 10.

FIG. 11 is a view illustrating a timing diagram for the DPCH signal demodulation process shown in FIG. 10.

For the convenience of description and better understanding of the present invention, a signal received over a pilot field, among the DPCH signals, is adapted as an example in FIG. 11. A signal received over a UE's antenna enters the STTD decoder 1011 and the DPCCH processor 1013 at a particular timing of 0 on the time axis (t). Then, the pilot signal among the DPCH signals is controlled by the DPCCH processor 1013 at a particular timing of t3 on the time axis. A SIR value of the received DPCH signal is calculated with the demodulated pilot signal. A TPC command for controlling a PC function of the UE is produced with the calculated SIR value at a particular timing of t4 on the time axis. Therefore, in case of demodulating a pilot signal as shown in FIG. 11, a delay time caused by the STTD decoding is not generated.

As apparent from the above description, according to the present invention, there is no need to perform an additional STTD decoding corresponding to the STTD encoding in a CDMA communication system even though a STTD-encoded DPCH signal enters the CDMA communication system, thereby quickly detecting the pilot and TPC signals of the DPCH signal. Therefore, a DPCH PC operation is quickly performed using the detected TPC and pilot signals, resulting in the enhancement of system performance.

While the invention has been shown and described with reference to certain preferred embodiments thereof, it will be understood by that various changes in form and details may be made therein without departing from the scope and spirit of the invention as defined by the appended claims.

What is claimed is:

1. An apparatus for receiving power control (PC) information in a communication system wherein a transmitter with first and second antennas space time transmit diversity (STTD)-encodes a channel having the PC information of a receiver and transmits a STTD-encoded result over the first and second antennas, comprising:
   a first antenna signal processor adapted to receive a signal transmitted from the transmitter, and multiply the received signal as a signal transmitted from the first antenna with a first pattern;
   a second antenna signal processor adapted to multiply the received signal as a signal transmitted from the second antenna with a second pattern orthogonal to the first pattern; and
   an adder adapted to combine an output signal of the first antenna signal processor with an output signal of the second antenna signal processor, and generate the PC information.

2. The apparatus as set forth in claim 1, wherein the first antenna signal processor includes:
   a first multiplier adapted to receive the received signal, and multiply the received signal by the first pattern; and
   a first accumulator adapted to accumulate an output signal of the first multiplier during a predetermined time corresponding to a size of a field containing PC information of the channel.

3. The apparatus as set forth in claim 1, wherein the second antenna signal processor includes:
   a second multiplier adapted to receive the received signal, and multiply the received signal by the second pattern; and
   a second accumulator adapted to accumulate an output signal of the second multiplier during a predetermined time corresponding to a size of a field containing PC information of the channel.

4. The apparatus as set forth in claim 1, wherein the channel is a dedicated physical channel (DPCH).

5. The apparatus as set forth in claim 4, wherein the PC information is composed of power control (PC) bits or pilot bits.

6. The apparatus as set forth in claim 5, wherein in case of PC information composed of the PC bits, the first pattern and the second pattern include ANT1's patterns and ANT2's patterns, respectively, as shown in the following table:

TABLE

| | The number of TPC (Transmit Power Control) bits within one slot | | | | | | | | | | | | | |
|---|---|---|---|---|---|---|---|---|---|---|---|---|---|---|
| | 2 | | 4 | | | | 8 | | | | | | | |
| ANT1 | 1 | 1 | 1 | 1 | 1 | 1 | 1 | 1 | 1 | 1 | 1 | 1 | 1 | 1 |
| ANT2 | – | | –1 | 1 | 1 | –1 | –1 | 1 | 1 | –1 | –1 | 1 | 1 | –1 |

7. An apparatus for receiving power control (PC) information in a communication system wherein a transmitter with first and second antennas space time transmit diversity (STTD)-encodes the PC information of a receiver along with adjacent data information, and transmits a STTD-encoded channel signal over the first and second antennas, comprising:
   a STTD decoder adapted to receive a signal transmitted from the transmitter, receive a first compensation signal channel-compensated with a first antenna channel estimation value and a second compensation signal channel-compensated with a first antenna channel estimation value, decode the first compensation signal and the second compensation signal, and sequentially generate a plurality of information in the order from last-in (LI) information to first-in (FI) information; and
   a multiplier adapted to detect the PC information using an output signal of the STTD decoder and a first pattern.

8. The apparatus as set forth in claim 7, wherein the transmitter transmits data information prior to transmitting the PC information.

9. The apparatus as set forth in claim 7, wherein the channel is a dedicated physical channel (DPCH).

10. The apparatus as set forth in claim 9, wherein the PC information is composed of power control (PC) bits or pilot bits.

11. The apparatus as set forth in claim 10, wherein in case of the PC information composed of the PC bits, the first pattern and the second pattern orthogonal to the first pattern include ANT1's patterns and ANT2's patterns, respectively, as shown in the following table:

TABLE

| | The number of TPC (Transmit Power Control) bits within one slot | | | | | | | | | | | | |
|---|---|---|---|---|---|---|---|---|---|---|---|---|---|
| | 2 | | 4 | | | 8 | | | | | | | |
| ANT1 | 1 | 1 | 1 | 1 | 1 | 1 | 1 | 1 | 1 | 1 | 1 | 1 | 1 |
| ANT2 | – | | –1 | 1 | 1 | –1 | –1 | 1 | 1 | –1 | –1 | 1 | 1 | –1 |

12. A method for receiving power control (PC) information in a communication system wherein a transmitter with first and second antennas space time transmit diversity (STTD)-encodes a channel having the power control (PC) information of a receiver and transmits a STTD-encoded result over the first and second antennas, comprising:
   receiving a signal transmitted from the transmitter, and multiplying the received signal as a signal transmitted from the first antenna with a first pattern;
   multiplying the received signal as a signal transmitted from the second antenna with a second pattern orthogonal to the first pattern; and
   combining a result signal of the receiving step with a result signal of the processing step, and generating the PC information.

13. The method as set forth in claim 12, wherein the receiving step for processing the first antenna signal comprises:
   receiving the received signal, and multiplying the received signal by the first pattern; and
   accumulating a multiplied result signal of the received signal and the first pattern during a predetermined time corresponding to a size of a field containing PC information of the channel.

14. The method as set forth in claim 12, wherein the processing step for processing the second antenna signal comprises:
   receiving the received signal, and multiplying the received signal by the second pattern; and
   accumulating a multiplied result signal of the received signal and the second pattern during a predetermined time corresponding to a size of a field containing PC information of the channel.

15. The method as set forth in claim 12, wherein the channel is a dedicated physical channel (DPCH).

16. The method as set forth in claim 15, wherein the PC information is composed of PC bits or pilot bits.

17. The method as set forth in claim 16, wherein in case of PC information composed of the PC bits, the first pattern and the second pattern include ANT1's patterns and ANT2's patterns, respectively, as shown in the following table:

TABLE

| | The number of TPC (Transmit Power Control) bits within one slot | | | | | | | | | | | | |
|---|---|---|---|---|---|---|---|---|---|---|---|---|---|
| | 2 | | 4 | | | 8 | | | | | | | |
| ANT1 | 1 | 1 | 1 | 1 | 1 | 1 | 1 | 1 | 1 | 1 | 1 | 1 | 1 |
| ANT2 | – | | –1 | 1 | 1 | –1 | –1 | 1 | 1 | –1 | –1 | 1 | 1 | –1 |

18. A method for receiving power control (PC) information in a communication system wherein a transmitter with first and second antennas space time transmit diversity (STTD)-encodes power control information of a receiver along with adjacent data information, and transmits a STTD-encoded channel signal over the first and second antennas, comprising the steps of:
   receiving a signal transmitted from the transmitter;
   receiving a first compensation signal channel-compensated with a first antenna channel estimation value and a second compensation signal channel-compensated with a first antenna channel estimation value;
   decoding the first compensation signal and the second compensation signal, and sequentially generating a plurality of information in the order from last-in (LI) information to first-in (FI) information; and
   detecting the PC information using a STTD-decoded signal and a first pattern.

19. The method as set forth in claim 18, wherein the transmitter transmits data information prior to transmitting the PC information.

20. The method as set forth in claim 18, wherein the channel is a dedicated physical channel (DPCH).

21. The method as set forth in claim 20, wherein the PC information is composed of PC bits or pilot bits.

22. The method as set forth in claim 21, wherein in case of the PC information composed of the PC bits, the first pattern and the second pattern orthogonal to the first pattern include ANT1's patterns and ANT2's patterns, respectively, as shown in the following table:

TABLE

| | The number of TPC (Transmit Power Control) bits within one slot | | | | | | | | | | | | | |
|---|---|---|---|---|---|---|---|---|---|---|---|---|---|---|
| | 2 | | 4 | | | 8 | | | | | | | | |
| ANT1 | 1 | 1 | 1 | 1 | 1 | 1 | 1 | 1 | 1 | 1 | 1 | 1 | 1 | 1 |
| ANT2 | – | | –1 | 1 | 1 | –1 | –1 | 1 | 1 | –1 | –1 | 1 | 1 | –1 |

\* \* \* \* \*